June 10, 1930.  W. COOPER ET AL  1,762,854
SAW SHARPENING MACHINE
Filed March 28, 1928   3 Sheets-Sheet 1
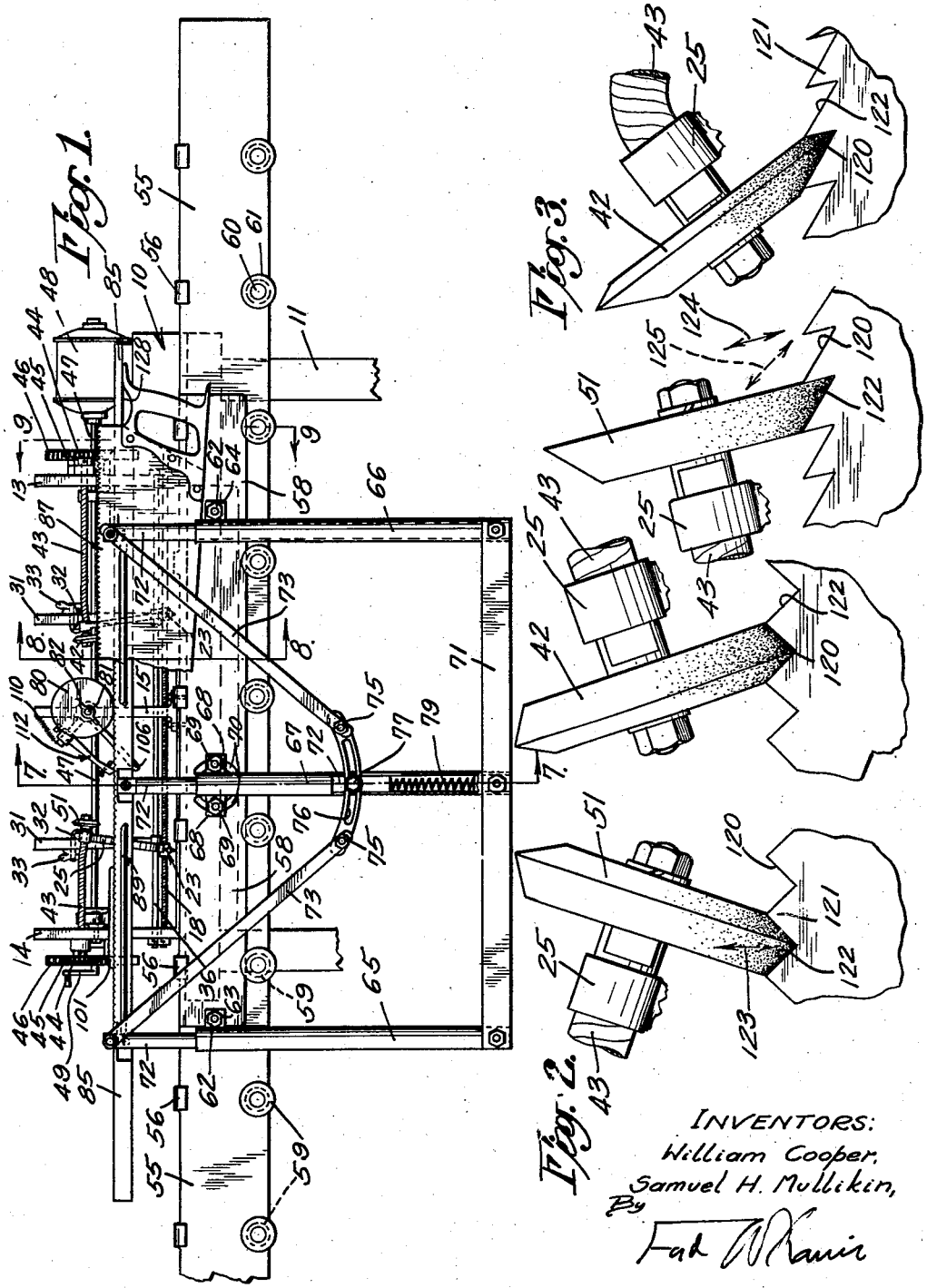
INVENTORS:
William Cooper,
Samuel H. Mullikin,
By
ATTORNEY.

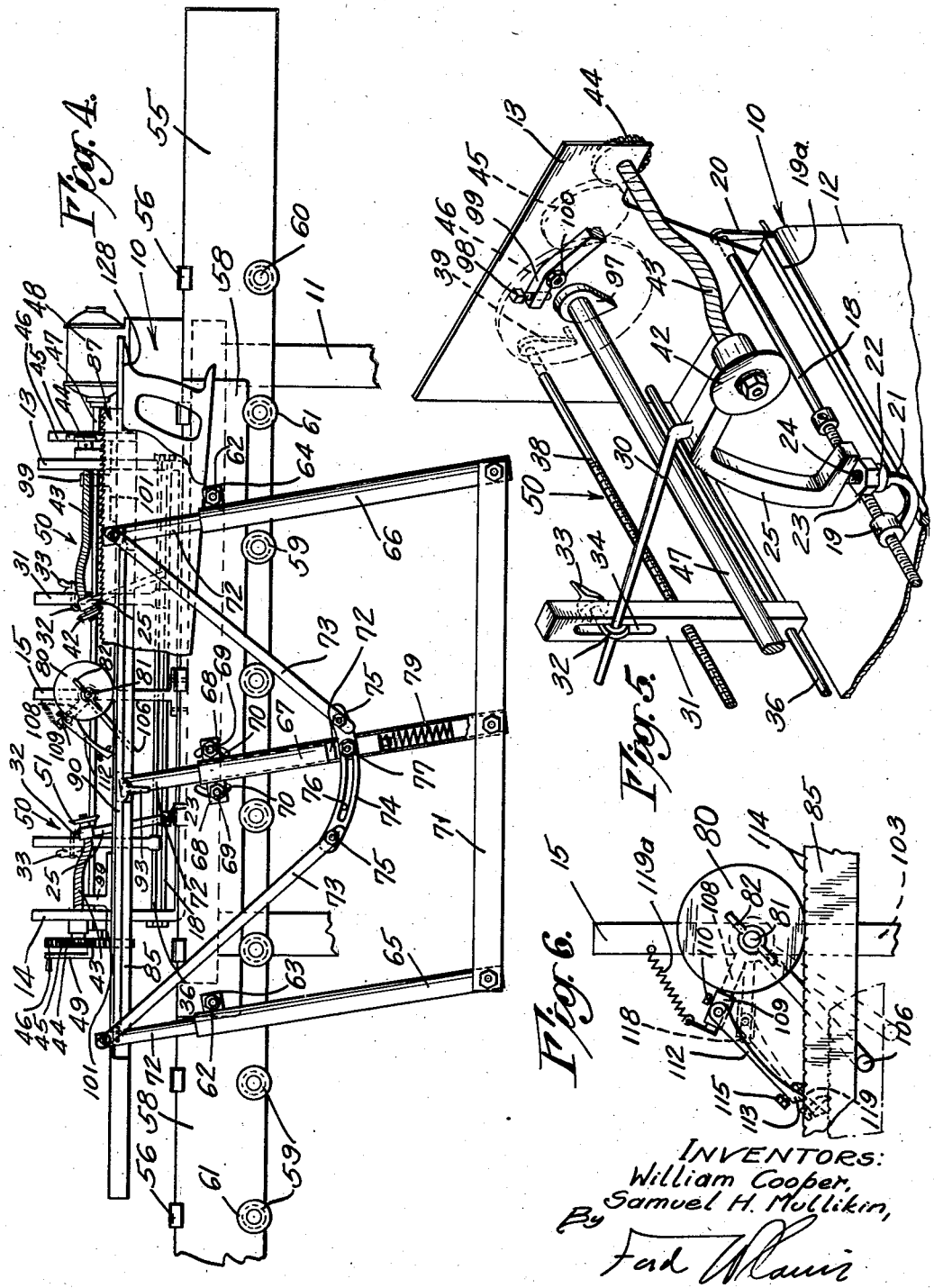

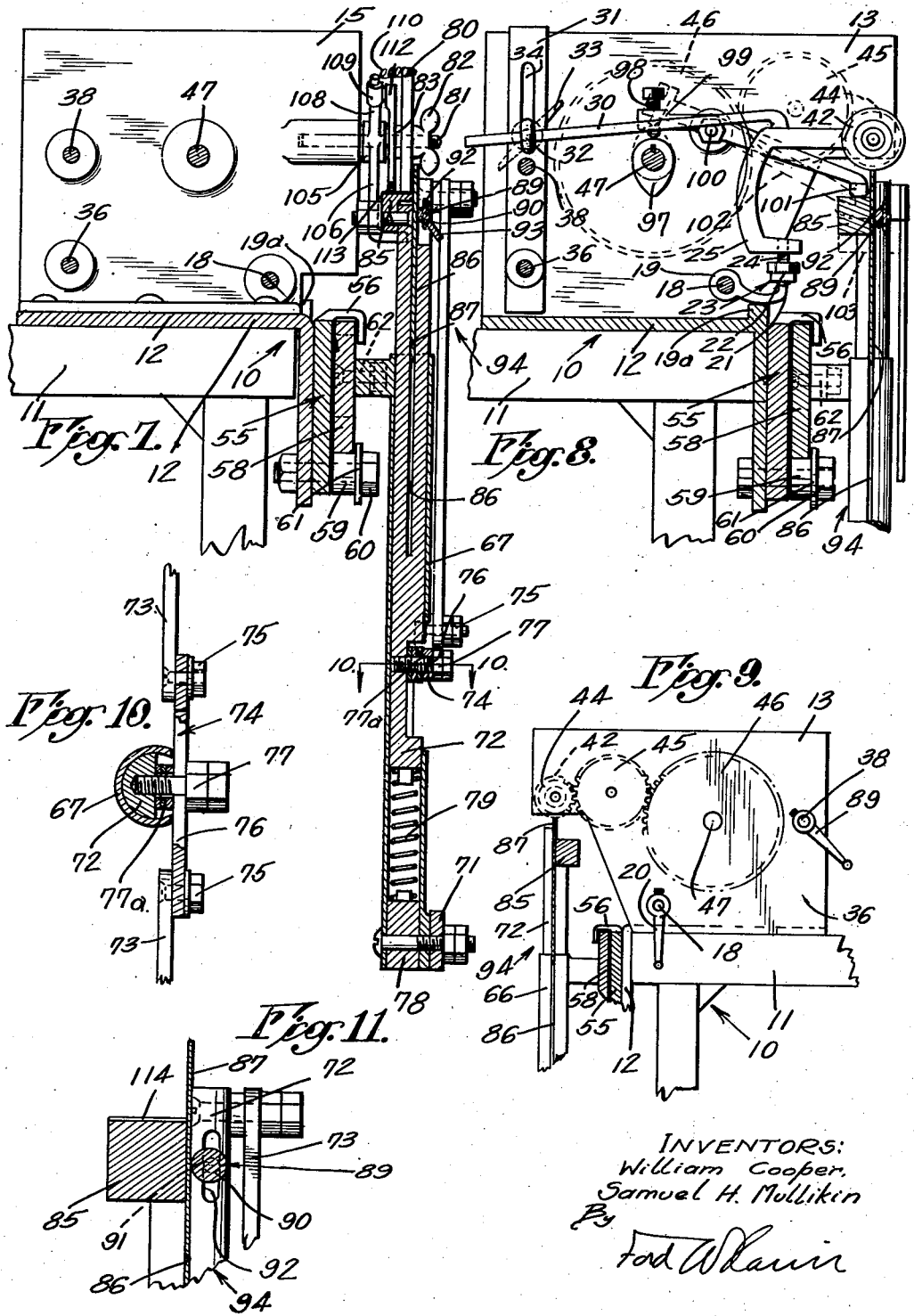

Patented June 10, 1930

1,762,854

UNITED STATES PATENT OFFICE

WILLIAM COOPER AND SAMUEL H. MULLIKIN, OF VAN NUYS, CALIFORNIA

SAW-SHARPENING MACHINE

Application filed March 28, 1928. Serial No. 265,306.

Our invention relates to an improved saw sharpening machine in which the saw is sharpened by one or more rotating abrasive wheels.

It is an object of our invention to provide a saw sharpening machine adapted to sharpen all types of saws, the machine being adjustable to sharpen different saws with a minimum amount of adjustment.

Another object of our invention is to provide a saw sharpening machine in which the saw is retracted from engagement with the abrasive wheels, and advanced before again coming into engagement with these wheels.

Still another object of our invention is to provide such a saw sharpening machine in which the direction and amount of movement of the saw may be changed.

Another object of our invention is to provide a saw sharpening machine which is automatic in operation, the saw being advanced a sufficient distance to successively sharpen the teeth thereof, this distance being variable to permit the sharpening of saws having different numbers of teeth per unit of distance.

Still another object of our invention is to provide an abrasive means which is easily adjustable in any position to permit the sharpening of any shape or size of tooth.

Further objects and advantages of our invention will be made evident hereinafter.

Referring to the drawings in which we illustrate one form of our invention,—

Fig. 1 is a front view of our saw sharpening machine.

Figs. 2 and 3 are diagrammatic views illustrating the adaptability of our machine to different shapes of saw teeth.

Fig. 4 is a front view similar to Fig. 1, the apparatus being shown in a slightly different position.

Fig. 5 is a perspective view illustrating the adjustable mounting of one abrasive wheel.

Fig. 6 is an enlarged view of the advancing means illustrated in Figs. 1 and 4.

Fig. 7 is a cross-sectional view taken on the line 7—7 of Fig. 1.

Fig. 8 is a cross-sectional view taken on the line 8—8 of Fig. 1.

Fig. 9 is an end view taken on the line 9—9 of Fig. 1.

Fig. 10 is a detailed sectional view taken on the line 10—10 of Fig. 7.

Fig. 11 is an enlarged detail view of the clamping means of our invention.

Our invention comprises a supporting structure 10 which may conveniently be mounted adjacent the edge of a table 11. This supporting structure includes an angle-iron 12 which extends above and in front of the table 11, as best illustrated in Figs. 5, 7, and 8. Extending upward from the ends of the angle-iron 12 are head members 13 and 14 which are similar in shape to a center block 15 extending upward from the angle-iron between these head members.

Referring particularly to Fig. 5, our machine has an arbor adjusting screw 18 journalled in the head member 13 and in the center block 15 so as to be rotatable therein, but not movable along its axis. This arbor adjusting screw is threaded and receives a hook member 19 which is adapted to move along the length of a bar 19$^a$ and in contact therewith when the screw 18 is rotated by means of a crank 20. The upper end of the hook member 19 has a ball 21 thereon which fits in a socket 22 of a vertical adjusting member 23, this member having a pin 24 extending upward therefrom. The pin 24 is threadedly received by the lower end of an arbor 25 in such a manner that by rotating the vertical adjusting member 23 the vertical position of the arbor may be changed. Similarly, by rotating the arbor adjusting screw 18, the lateral position of the arbor 25 may be changed. The ball 21 and socket 22 cooperate to form a ball-and-socket joint for this arbor.

Extending rearward from the upper end of the arbor 25 is an arm 30, this arm being clamped adjacent a post 31 by means of a hook 32. This hook has a thumb-screw 33 threaded thereto, and is adapted to pass through an elongated slot 34 of the post 31 in order to adjustably mount the arm 30 relative to the post 31. The post 31 is adapted to slide on a rod 36 secured in the head member 13 and the center block 15. The position of this post relative to the rod 36 is determined by a post adjusting screw 38 which is similar in construction to the arbor adjusting screw 18, being similarly journalled in the head member 13 and center block 15 and having a crank 39 thereon. By rotating the crank 39, the post 31 may be moved in a vertical plane along the rod 36.

Journalled in the upper arm of the arbor 25 is an abrasive wheel 42 which is driven by a flexible shaft 43 or an equivalent driving means. The other end of this flexible shaft 43 is secured to a stub-shaft journalled in the head member 13, this shaft having a pinion 44 secured thereto outside the head member 13. This pinion is adapted to mesh with an idler 45 which, in turn, meshes with a gear 46 secured to a shaft 47 journalled in the head members 13 and 14 and the center block 15. The shaft 47 is driven by a motor 48 or other suitable prime mover. A crank 49 is secured to the opposite end of the shaft 47 outside the head member 14, this crank being utilized in manually operating the saw sharpening machine of our invention, if so desired.

The adjusting screws 18 and 38, together with the post 31 and its hook 32, comprise an abrasive-wheel-adjusting means, indicated by the numeral 50. As described, this adjusting means extends only between the head member 13 and the center block 15. As clearly shown in Figs. 1 and 4, a duplicate adjusting means 50 is positioned between the head 14 and the center block 15, this adjusting means being adapted to adjust the position of an abrasive wheel 51 actuated by a driving means identical with that positioned between the head member 13 and the center block 15. A similar gearing is arranged between the flexible shaft and the shaft 47. It should be understood that the shaft 47 extends entirely through the apparatus, while the adjusting screws 18 and 38 extend only between their respective head members and the center block 15, thus permitting the abrasive wheels 42 and 51 to be individually adjusted.

Secured to the front edge of the angle-iron 12 is a suitable longitudinal track 55. This track comprises hook portions 56 which extend over, and retain in sliding relationship, a follower member 58. The lower end of this follower member is permitted to easily move along the track 55 by means of rollers 59 mounted on bolts 60 which extend through the angle-iron 12. Washers 61 on the bolts 60 prevent the follower member 58 from leaving the track 55. This form of track is described only for illustrative purposes, it being understood that various structural modifications might be made without departing from the spirit of this invention.

Pivoted to the follower member 58 on bolts 62 are lug members 63 and 64 which are attached to end guides 65 and 66 respectively. Also mounted in pivotal relation to the follower member 58 is a central guide 67, this guide having lugs 68 extending in opposite directions therefrom. The lugs 68 receive bolts 69 which may slide in elongated annular slots 70 of the follower member 58. The lower end of each of the guides 65 to 67 inclusive is pivotally attached to a spacer bar 71 so that when the bolts 62 and 69 are loosened, the guides 65 to 67 inclusive may be moved in parallelism, as indicated in Fig. 4.

Each of the guides 65 to 67 inclusive is circular in cross-section and adapted to receive a plunger 72, these plungers being slidable in the guides. The upper end of the plungers 72 sliding in the guides 65 and 66 are pivoted to a pair of braces 73, these braces converging downward and being, in turn, pivoted to an arcuate member 74 by bolts 75. This arcuate member has an elongated opening 76 formed therein through which a bolt 77 passes, this bolt being received by the plunger 72 in the center guide 67, as best illustrated in Figs. 7 and 10. Washers 77$^a$ separate the arcuate member 74 from the plunger 72 of the center guide 67. The lower end of this center guide is closed by a member 78 and a compression spring 79 is compressed between the member 78 and the lower end of the plunger 72 in this guide. This spring thus acts to move each of the plungers 72 in an upward direction, this upward movement being limited by an eccentric disc 80 pivoted to the center block 15 on a bolt 81 having a thumb-screw 82 thereon. This thumb-screw clamps the eccentric disc 80 against a shoulder 83 formed on the bolt 81.

By changing the position of the eccentric disc 80 relative to the bolt 81, the maximum upper position of the plungers may be regulated.

The upper ends of the plungers 72 are also pivoted to a bar 85, this bar cooperating with the spacer bar 71 to maintain the parallelism of the guides 65 to 67 inclusive and their respective plungers 72. The upper ends of each of the plungers 72 have a saw-retaining channel 86 formed therein, this channel being adapted to receive a saw 87 having teeth 88 which are to be sharpened. The guides 65 to 67 inclusive have corresponding notches therein to permit the saw to slide vertically therein. This saw 87 is clamped in the channel 86 and against the bar 85 by a suitable clamping means, indicated by the numeral 89. This clamping means comprises a circular bar 90 having an eccentric pin 91 extending from each end thereof. These eccentric pins are adapted to be received in elongated openings 92 of the plungers 72 in the end guide members. A handle 93 extends outward from the circular bar 90 in such a manner that when the saw 87 is in place, and the handle 93 is depressed, the eccentric pins 91 force the circular bar 90 into engagement with the saw 87 so as to force this saw against the bar 85.

The saw 87 is thus clamped in a sawclamping means indicated by the numeral 94, this saw-clamping means comprising the follower member 58 and its attached parts. It should thus be clear that the sawclamping means is movable along the track 55 and that the saw may be moved in a direction parallel to the guides 65 to 67 inclusive to lower this saw from engagement with the abrasive wheels 42 and 51. Thus, by providing a suitable lowering mechanism to lower the saw and the plungers, and, in addition, an advancing mechanism for advancing the clamping-means along the track 55 when the saw is in a lowered position, we are able to achieve automatic sharpening of the saw.

The lowering mechanism provided for lowering the saw-clamping means 94 is best illustrated in Figs. 5 and 8. Referring to these figures, the shaft 47 has a cam 97 attached thereto just inside each head member 13. These cams engage followers in the form of screws 98 threadedly received by inner ends of cranks 99 which are respectively pivoted just inside the head members 13 and 14 on bolts 100. The forward end of each of these cranks 99 has a horizontal engager 101 which operates in engagement with the upper face of the bar 85. Thus, with each revolution of the shaft 47, the cam 97 moves the cranks 99 into a position indicated by dotted lines 102 of Fig. 8, this movement depressing the bar 85 into a dotted line position indicated by the numeral 103, thus lowering the saw 87 from engagement with the abrasive wheels.

Adapted to advance the saw one tooth during this period of disengagement is the advancing mechanism, best shown in Figs. 1, 4, 6, and 7. This advancing mechanism comprises a hub 105 pivoted to the bolt 81 between the center block 15 and the shoulder 83. An arm 106 extends downward from this hub and under the bar 85 so that a downward movement of the bar causes the hub 105 to pivot on the bolt 81. An arm 108 extends from the hub 105 at an angle with the arm 106, this arm being adapted to receive a sleeve 109 which is slidable thereon. The position of this sleeve is fixed by a set-screw 110 having a head thereon which may be manipulated by the operator's fingers. The arm 108 is suitably graduated so that the sleeve 109 may be correctly positioned thereon.

Pivoted to this sleeve 109 is a pawl 112 having a pointed lower end 113 which is adapted to engage one of a series of notches 114 cut in the upper surface of the bar 85. An adjusting screw 115 is threaded through the lower end 113 of the pawl 112, this adjusting screw coming into contact with the upper surface of the notched bar 85 when the acute angle between the pawl and the bar is decreased. By adjusting this screw 115, the lower end 113 of the pawl 112 may be caused to disengage a notch 114 at any desired instant. This may best be understood by considering the operation of the advancing means when the lowering mechanism lowers the bar 85 from its full line position shown in Fig. 8 into its dotted line position indicated by the numeral 103 of Figs. 8 and 6. As previously mentioned, this downward movement of the bar causes a rotation of the hub 105 which, in turn, causes a counterclockwise rotation of the arm 108, moving this arm into a position indicated by the numeral 118. During this movement the pawl 112 is forced into a position indicated by the numeral 119, this movement forcing the bar 85 in a leftward direction. During this movement the angle between the pawl 112 and the bar 85 is decreased due to the peculiar lengthening linkage between the pawl and the arm 108. The amount of this leftward movement may be regulated by changing the position of the sleeve 109 on the arm 108, but due to the fact that the notches 114 are not infinitesimal in size, it is necessary to provide a further adjusting means for accurately determining the advancement of the bar 85. This adjustment is provided in the form of the adjusting screw 115 which bears against the bar 85 when the angle between the pawl and the bar becomes less, this engagement between the screw and the bar forcing the pointed end 113 from the groove 114 with which it was engaging.

A spring 119$^a$ is stretched between the arm 108 and the center block 15 to keep the arm 106 in contact with the bar 85.

We prefer to utilize the abrasive wheel 42 for grinding a primary notch 120 between teeth 121 of the saw 87, and to utilize the abrasive wheel 51 for grinding a secondary notch 122 between the teeth 121, these abrasive wheels having grinding surfaces formed to cut the desired shape and size of notch between teeth. In certain saws these notches are not filed or ground at the same angle relative to the plane of the saw. Thus, it is necessary to set the abrasive wheels 42 and 51 in planes which are not parallel to each other.

When sharpening cross-cut saws such as illustrated in Fig. 2, the guides 65 to 67 inclusive are set in a vertical direction so that the saw moves in the vertical direction indicated by the double-headed arrow 123 of Fig. 2 when being withdrawn from contact with the abrasive wheels. In this type of saw the front surfaces of each tooth form acute angles with a line drawn through the cutting edges of the teeth. When it is desired to sharpen a rip-saw having hook-shaped teeth of the shape indicated in Fig. 3, it is necessary to move the guides into such a position that the direction of movement of the saw will be indicated by a double-headed arrow 124 of Fig. 3. It will be noted that this arrow is parallel to the front surface of the tooth 121. By still further angling the guides, it is possible to move the saw in a direction indicated by the double-headed arrow 125. The controlling rule is that the direction of withdrawal of the saw must lie in the angle subtended by the space between the teeth on the saw in order that the cutting edge of the tooth be not destroyed when the saw is withdrawn from contact with the abrasive wheels.

This movement of the guides from their vertical position is easily accomplished by loosening the bolts 75 and 77, at which time the guides may move from their position shown in Fig. 1 into that shown in Fig. 4, or to any intermediate position. The bolts 75 and 77 are then tightened and the correct angle of withdrawal is invariably secured. The movement of the pistons relative to the circular bar 90 is permitted by the elongated slots 92 in which the pins 91 may move.

In operating our invention, the saw 87 is first clamped against the bar 85 by the clamping means 89, the handle of the saw fitting in a depression 128 formed in the lower part of the notched bar 85. The correct abrasive wheel 42 is next chosen and mounted in a position so that the cutting or grinding surfaces thereof are parallel to the front and back surfaces of the teeth 121, thus correctly grinding one primary notch 120. This angle may be obtained by suitably turning the crank 20 relative to the crank 39 and by adjusting the adjusting member 23 and the hook 32. The abrasive wheel 51 is next similarly adjusted so as to correctly grind one secondary notch 122, the distance between these abrasive wheels being properly determined so that these wheels may simultaneously grind these primary and secondary notches. The lowering mechanism is then adjusted by the screw 98 and the eccentric disc 80 in such a manner that the saw is lowered a suitable distance so that the teeth clear the abrasive wheels, the uppermost position of the saw being adjusted by means of the eccentric disc 80 and the amount of lowering being determined by the screw 98. The sleeve 109 and the adjusting screw 115 are next positioned so that the saw will be fed forward the correct distance so that the abrasive wheels will come into correct alignment with a succeeding tooth each time the saw is returned to its uppermost position.

After thus setting the machine, the front tooth of the saw is then correctly positioned in contact with the abrasive wheel 42 and the motor is started. The advancing means moves the saw forward the correct distance each time the saw is lowered. The track 55 is made long enough so that all of the teeth on the saw will be engaged by the abrasive wheels 42 and 51 as the saw passes once through the machine.

We prefer to use a notched bar 85 which is slightly crowned so that it conforms in contour to the crown of the saw. Ordinarily the amount of crown is nearly standard but if it is desired to sharpen a saw with excessive crown, the bar 85 may be interchanged with a bar having a crown corresponding to that of the saw to be sharpened.

We claim as our invention:

1. In a saw sharpening machine, the combination of: a supporting structure; an abrasive wheel adjustably mounted on said supporting structure; means for driving said abrasive wheel; a track carried by said supporting structure; saw-clamping means slidable along said track; a lowering mechanism for moving said saw-clamping means to withdraw a saw clamped therein from engagement with said abrasive wheel; means for varying the direction of withdrawal of said saw-clamping means; and advancing means for advancing said saw-clamping means when said wheel and said saw are not in contact.

2. In a saw sharpening machine, the combination of: a supporting structure; an abrasive wheel adjustably mounted on said supporting structure; means for driving said abrasive wheel; a track carried by said supporting structure; a follower member movable along said track; guides mounted on said follower member; plungers movable in said guides; clamping means for clamping a saw relative to said plungers; and a lowering mechanism for moving said plungers in said guides to move said saw from engagement with said abrasive wheel.

3. In a saw sharpening machine, the combination of: a supporting structure; an abrasive wheel adjustably mounted on said supporting structure; means for driving said abrasive wheel; a track carried by said supporting structure; a follower member movable along said track; guides mounted on said follower member; plungers movable in said guides; clamping means for clamping a saw relative to said plungers; a lowering mechanism for moving said plungers in said guides to move said saw from engagement with said abrasive wheel; and advancing means for advancing said follower member along said track.

4. A combination as defined in claim 2 in which said guides are pivoted to said follower member.

5. A combination as defined in claim 2 in which said guides are pivoted to said follower member, and including means for keeping said guides parallel when pivoted relative to said follower member.

6. In a saw sharpening machine, the combination of: a supporting structure; an abrasive wheel adjustably mounted on said supporting structure; means for driving said abrasive wheel; a track carried by said supporting structure; a follower member movable along said track; guides mounted on said follower member; plungers movable in said guides; a notched bar connecting said plungers; clamping means for clamping a saw adjacent said bar; a lowering mechanism for moving said plungers in said guides to move said saw from engagement with said abrasive wheel; and an arm actuated by the movement of said bar, and engaging the notches thereof, adapted to advance said follower member in said track.

7. In a saw sharpening machine, the combination of: a supporting structure; an abrasive wheel adjustably mounted on said supporting structure; means for driving said abrasive wheel; a track carried by said supporting structure; a follower member movable along said track; guides mounted on said follower member; plungers movable in said guides; a notched bar connecting said plungers; clamping means for clamping a saw adjacent said bar; a lowering mechanism for moving said plungers in said guides to move said saw from engagement with said abrasive wheel; an arm actuated by the movement of said bar, and engaging the notches thereof, adapted to advance said follower member in said track; and means on said arm for adjusting the amount of movement of said follower member.

8. In a saw sharpening machine, the combination of: a supporting structure; a head member on said structure; an arbor; an abrasive wheel carried by said arbor; an arbor adjusting screw determining the lateral position of the lower end of said arbor; an arm extending from said arbor, said arm being adjustably connected to said supporting structure to determine the angular and forward position of said abrasive wheel; and a saw-clamping means movable relative to said abrasive wheel.

9. In a saw sharpening machine, the combination of: a supporting structure; a head member on said structure; an arbor; an abrasive wheel carried by said arbor; an arbor adjusting screw determining the lateral position of the lower end of said arbor; an arm extending from said arbor; a post slidable relative to said head member; means for adjustably securing said arm to said post; and a saw-clamping means movable relative to said abrasive wheel.

10. A combination as defined in claim 8 in which said arbor and said arbor adjusting screw are connected by a ball-and-socket joint.

In testimony whereof, we have hereunto set our hands, at Los Angeles, California, this 23rd day of March, 1928.

WILLIAM COOPER.
SAMUEL H. MULLIKIN.